(12) United States Patent
Sanchez Rocha et al.

(10) Patent No.: US 10,599,879 B2
(45) Date of Patent: Mar. 24, 2020

(54) OPTIMAL PRESSURE-PROJECTION METHOD FOR INCOMPRESSIBLE TRANSIENT AND STEADY-STATE NAVIER-STOKES EQUATIONS

(71) Applicant: Dassault Systemes Simulia Corp., Johnston, RI (US)

(72) Inventors: Martin Sanchez Rocha, Providence, RI (US); Blair Perot, Amherst, MA (US)

(73) Assignee: DASSAULT SYSTEMES SIMULIA CORP., Johnston, RI (US)

( * ) Notice: Subject to any disclaimer, the term of this patent is extended or adjusted under 35 U.S.C. 154(b) by 459 days.

(21) Appl. No.: 15/185,707

(22) Filed: Jun. 17, 2016

(65) Prior Publication Data

US 2017/0364615 A1  Dec. 21, 2017

(51) Int. Cl.
*G06F 17/50* (2006.01)
*G06F 30/20* (2020.01)
*G06F 30/23* (2020.01)
*G06F 111/10* (2020.01)

(52) U.S. Cl.
CPC ............ *G06F 30/20* (2020.01); *G06F 30/23* (2020.01); *G06F 2111/10* (2020.01)

(58) Field of Classification Search
CPC ............ G06F 17/5009; G06F 17/5018; G06F 2217/16
See application file for complete search history.

(56) References Cited

U.S. PATENT DOCUMENTS

| 6,611,736 B1* | 8/2003 | Waite ............... | G06F 17/5018 700/281 |
| 2009/0234624 A1* | 9/2009 | Yu .................. | G06F 17/5018 703/9 |
| 2011/0288834 A1* | 11/2011 | Yamazaki .......... | G06F 17/5009 703/2 |
| 2012/0249560 A1* | 10/2012 | Dickenson .......... | G06F 17/16 345/505 |

OTHER PUBLICATIONS

Kyoungyoun Kim, Seung-Jin Baek and Hyung Jin Sung; An implicit velocity decoupling procedure for the incompressible Navier-Stokes equations; 14 pages; 2002 (Year: 2002).*

(Continued)

*Primary Examiner* — Brian W Wathen
*Assistant Examiner* — Kimberly L Jordan
(74) *Attorney, Agent, or Firm* — Armstrong Teasdale LLP

(57) ABSTRACT

Embodiments of the present invention simulate a real-world system by first generating a time dependent system of equations that represents the real-world system where the time dependent system of equations has a defined constraint. Next, the constraint is de-coupled from the time-dependent system of equations using a matrix representing an approximation of physics of the real-world system, the de-coupling generating a first system of equations representing the constraint and a second system of equations representing physics of the real-world system. In turn, the generated first and second systems of equations are solved and the real-world system is automatically simulated by generating a simulation using results from solving the first and second systems of equations.

15 Claims, 5 Drawing Sheets

(56) References Cited

OTHER PUBLICATIONS

Extended European Search Report, EP17175907.9, "Optimal Pressure-Projection Method for Incompressible Transient and Steady-State Navier-Stokes Equations," dated Oct. 30, 2017.

Hashimoto, T., et al., "Higher order numerical simulation of unsteady viscous incompressible flows using kinetically reduced local Navier-Stokes equations on a GPU", *Computers and Fluids*, vol. 110, pp. 108-113, Sep. 16, 2014.

Murali, A., et al., "A new mixed basis Navier-Stokes formulation for incompressible flows over complex geometries", *J. of Computational. Physics*, vol. 307, pp. 378-400, Dec. 12, 2015.

Pena, G., et al., "High order methods for the approximation of the incompressible Navier-Stokes equations in a moving domain", *Comput. Methods in Applied Mechanics and Engineering*, vol. 209, pp. 197-211, Oct. 8, 2011.

Chorin, A. J., "Numerical Solution of the Navier-Stokes Equations," *Math. Comput.*, 745-762 (1968).

Chorin, A. J., "The Numerical Solution of the Navier-Stokes Equations for an Incompressible Fluid," *Amer. Math. Soc.*, 73(6), 928-931 (1967).

Gresho, P., "Incompressible Fluid Dynamics: Some Fundamental Formulation Issues," *Annu. Rev. Fluid Mech.*, 413-453 (1991).

Guermond, J. L., Minev, P., & Shen, J., "An overview of projection methods for incompressible flows," *Comput. Methods Appl. Mech. Engrg.*, 6011-6045 (2006).

Issa, R. I., "Solution of Implicitly Discretized Fluid Flow Equations by Operator Splitting," *Journal of Computational Physics*, 40-65, (1985).

Lilek, Z., Muzaferija, S., Peric, M., "Efficiency and accuracy aspects of a full-multigrid SIMPLE algorithm for three-dimensional flows," *Numerical Heat Transfer, Part B: Fundamentals*, 23-42 (1997).

Morii, T., "A New Efficient Algorithm for Solving an Incompressible Flow on Relatively Fine Mesh," *Numerical Heat Transfer, Part B: Fundamentals*, 593-610 (2005).

Patankar, S. V., & Spalding, D. B., "A calculation procedure for heat, mass and momentum transfer in three dimensional parabolic flows," *Int. J. Heat Mass Transfer*, vol. 15, pp. 1787-1806 (1972).

Patankar, S. V., "Numerical Heat Transfer and Fluid Flow," New York, New York: *McGraw-Hill*, (1980).

Perot, J. B., "An Analysis of the Fractional Step Method," *Journal of Computational Physics*, 51-58 (1993).

Segal, A., ur Rehman, M., & Vuik, C., "Preconditioner for Incompressible Navier-Stokes Solvers," Numer. Math. Theor. Meth. Appl., vol. 3, No. 3, pp. 245-275 (2010).

Tannehill, J. C., Anderson, D. A., & Pletcher, R. H., "Computational Fluid Mechanics and Heat Transfer," [ISBN 1-56032-046-X], Second Edition, Philadelphia, *Taylor & Francis Publishers*, (1997).

Vandoormaal, J. P., & Raithby, G. D., "Enhancements of the SIMPLE Method for Predicting Incompressible Fluid Flows," *Numer. Heat Transfer*, vol. 7, pp. 147-163 (1984).

\* cited by examiner

OPTIMAL PRESSURE-PROJECTION METHOD FOR INCOMPRESSIBLE TRANSIENT AND STEADY-STATE NAVIER-STOKES EQUATIONS

BACKGROUND

Embodiments of the present invention generally relate to the field of computer programs and systems, and specifically to the fields of computer aided design (CAD), computer-aided engineering (CAE), modeling, and simulation.

A number of systems and programs are offered on the market for the design of parts or assemblies of parts. These so called CAD systems allow a user to construct and manipulate complex three-dimensional models of objects or assemblies of objects. CAD systems thus provide a representation of modeled objects, such as real-world objects, using edges or lines, in certain cases with faces. Lines, edges, faces, or polygons may be represented in various manners, e.g., non-uniform rational basis-splines (NURBS).

These CAD systems manage parts or assemblies of parts of modeled objects, which are mainly specifications of geometry. In particular, CAD files contain specifications, from which geometry is generated. From geometry, a representation is generated. Specifications, geometry, and representations may be stored in a single CAD file or multiple CAD files. CAD systems include graphic tools for representing the modeled objects to the designers; these tools are dedicated to the display of complex objects. For example, an assembly may contain thousands of parts.

The advent of CAD and CAE systems allows for a wide range of representation possibilities for objects. One such representation is a finite element analysis model. The terms finite element analysis model, finite element model, finite element mesh, and mesh are used interchangeably herein. A finite element model typically represents a CAD model, and thus, may represent one or more parts or an entire assembly of parts. A finite element model is a system of points called nodes which are interconnected to make a grid, referred to as a mesh.

Models, such as CAE models, finite element models, and computational fluid dynamics models, amongst others, may be programmed in such a way that the model has the properties of the underlying object or objects that it represents. When, for instance, a finite element model is programmed in such a way, it may be used to perform simulations of the object that it represents. For example, a finite element model may be used to represent the interior cavity of a vehicle, the acoustic fluid surrounding a structure, and any number of real-world objects, including, for example, medical devices such as stents. When a model represents an object and is programmed accordingly it may be used to simulate the real-world object itself. For example, a finite element model representing a stent may be used to simulate use of the stent in a real-life medical setting.

While methodologies exist for performing simulations of real-world systems, these existing methodologies can benefit from functionality to improve efficiency.

SUMMARY OF THE INVENTION

An embodiment of the present invention provides a computer implemented method for simulating a real-world system. In such an embodiment, through use of one or more computer processors, a time dependent system of equations that represents a real-world system and has a defined constraint is first generated. Next, the constraint is de-coupled from the time dependent system of equations using a matrix representing an approximation of physics of the real-world system, such that a first system of equations representing the constraint and a second system of equations representing physics of the real-world system is generated. In turn, the generated first and second systems of equations are automatically solved and the real-world system is automatically simulated by generating a simulation of the real-world system using results from solving the generated first and second systems of equations. According to an embodiment, solving the generated first system of equations and the generated second system of equations is performed without determining an inverse of the matrix representing an approximation of physics of the real-world system.

In an embodiment of the present invention, the simulation is a computational fluid dynamics (CFD) simulation. Further, according to an embodiment, the CFD simulation is a steady state simulation or a transient simulation. According to an embodiment of the present invention, the constraint is incompressibility of a fluid of the real-world system. An alternative embodiment of the present invention further comprises improving design of the real-world system using results of the simulation.

In yet another embodiment, the generated time dependent system of equations are Navier-Stokes equations. Further still, in an embodiment, the matrix representing an approximation of physics of the real-world system commutes with a matrix representing the constraint. According to another embodiment, the physics of the real-world system is motion.

An alternative embodiment of the present invention is directed to a computer system for simulating a real-world system. Such a computer system comprises a processor and memory with computer code instructions stored thereon. The processor and the memory, with the computer code instructions, are configured to cause the computer system to generate a time dependent system of equations representing a real-world system where the time dependent system of equations has a defined constraint. Further, the processor and the memory, with the computer code instructions, cause the computer system to de-couple the constraint from the time dependent system of equations using a matrix representing an approximation of physics of the real-world system. According to such an embodiment, the de-coupling generates a first system of equations representing the constraint and a second system of equations representing physics of the real-world system. The computer system is further configured to automatically solve the generated first system of equations and the generated second system of equations and, in turn, automatically simulate the real-world system by generating a simulation of the real-world system using results from solving the first and second systems of equations.

In one such computer system embodiment, solving the generated first system of equations and the generated second system of equations is performed without determining an inverse of the matrix representing an approximation of physics of the real-world system. According to an embodiment of the computer system, the simulation is a CFD simulation. Further, in such an embodiment, the CFD simulation may be a steady state simulation or a transient simulation. In an embodiment of the computer system, the constraint is incompressibility of a fluid in the real-world system.

In an alternative embodiment, the processor and the memory, with the computer code instructions, are further configured to cause the computer system to improve design of the real-world system using results of the simulation. In yet another embodiment, the generated time dependent system of equations are Navier-Stokes equations. According to an embodiment of the computer system, the matrix representing an approximation of physics of the real-world system commutes with a matrix representing the constraint. Further, in an embodiment, the physics of the real-world system is motion.

Yet another embodiment of the present invention is directed to a cloud computing implementation for simulating a real-world system. Such an embodiment is directed to a computer program product executed by a server in communication across a network with one or more clients. In such an embodiment, the computer program product comprises a computer readable medium which comprises program instructions, which, when executed by a processor, causes the processor to generate a time dependent system of equations representing a real-world system, where the time dependent system of equations has a defined constraint. Further, the instructions, when executed, cause the processor to de-couple the constraint from the time dependent system of equations using a matrix representing an approximation of physics of the real-world system. In such an embodiment, the de-coupling generates a first system of equations representing the constraint and a second system of equations representing physics of the real-world system. In response to the de-coupling, the processor is configured to automatically solve the generated first and second systems of equations and automatically simulate the real-world system by generating a simulation of the real-world system using results from solving the generated first and second systems of equations. According to an embodiment of the computer program product, solving the generated first system of equations and the generated second system of equations is performed without determining an inverse of the matrix representing an approximation of physics of the real-world system.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

Figure 1:
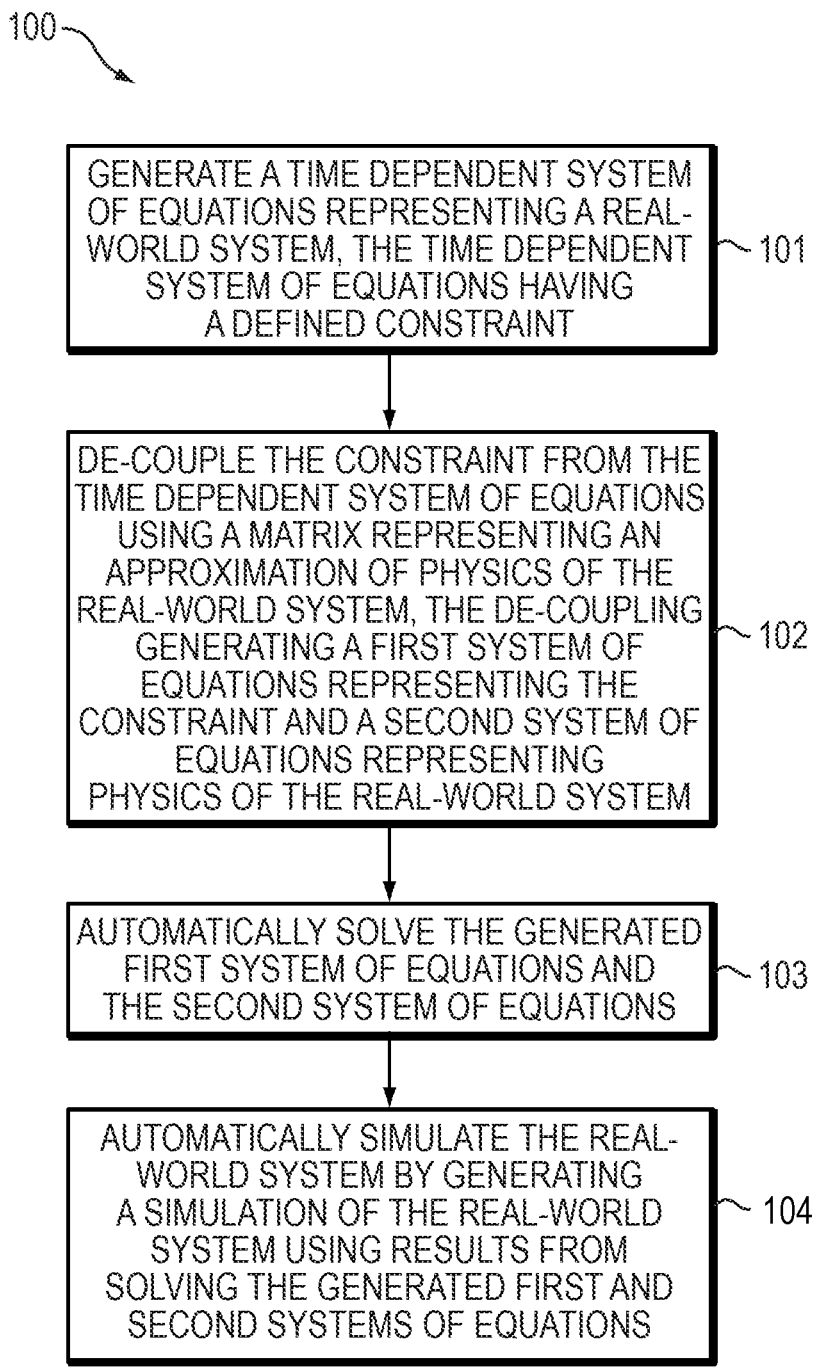
FIG. 1 is a flowchart of a method of simulating a real-world system according to the principles of an embodiment of the present invention.

A description of example embodiments of the invention follows.

The teachings of all patents, published applications, and references cited herein are incorporated by reference in their entirety.

Embodiments provide methods and systems for simulating real-world systems, e.g., a roller coaster on a track, in a variety of simulation fields, such as computational fluid dynamics. Embodiments can greatly improve simulation and design efficiency in a variety of fields. Research and development for engineering devices and real-world systems (contemplated and existing), such as devices that interact with fluids, e.g., combustion engines, aircrafts, or cars, usually requires construction of numerous, expensive, prototypes before a design cycle is complete. This iterative design process is not only time consuming and very expensive, but also impossible or too unsafe to perform in certain cases, such as hypersonic airplanes, space reentry vehicles, bomb detonations, and fusion reactors. Embodiments of the present invention alleviate or eliminate the cost of the prototype design cycle and further, can be utilized in cases where such a cycle cannot be performed. Thus, embodiments provide the ability to simulate working conditions of a device/real-world system of interest before any prototype is constructed.

For devices and real-world systems, in principle, it is possible to solve the equations, e.g., Navier-Stokes equations in the example of devices and systems that interact with fluids, that govern the dynamics, e.g., fluid dynamics, of the real-world system so as to simulate a particular situation and, in turn, use this information to improve the design of the real-world system. Such functionality can reduce the cost and time of the design process. In particular, for devices that interact with incompressible fluids or low speed flows, simulating these devices requires solving the incompressible version of the Navier-Stokes equations. However, numerically integrating the incompressible version of the Navier-Stokes equations, which is a complex, non-linear system of partial-differential equations is not an easy task, as described in Gresho, "Incompressible Fluid Dynamics: Some Fundamental Formulation Issues," *Annu. Rev. Fluid Mech.*, pages 413-453 (1991). Solving such a system of equations is further complicated because different algorithms have to be implemented depending on whether or not the conditions simulated are time-dependent or steady-state.

For time-dependent simulations, most numerical algorithms derive from ideas introduced by Chorin, "The numerical solution of the Navier-Stokes equations for an incompressible fluid," *Bull. Amer. Math. Soc.*, 73(6), pages 928-931 (1967), Chorin, "Numerical solution of the Navier-Stokes equations, *Math. Comput.*, pages 745-762 (1968), and Temam, "Sur l'approximation de la solution des equations de Navier-Stokes par la methode des pas fractionnaires ii," *Arch. Ration. mec. Anal.*, pages 673-688 (1969), of which, an extensive review is provided in Guermond et al., "An overview of projection methods for incompressible flows," *Comput. Methods Appl. Mech. Engrg*, pages 6011-6045 (2006). For steady-state solutions, Patankar et al., "A calculation procedure for heat, mass and momentum transfer in three dimensional parabolic flows," *Journal on Heat and Mass Transfer*, pages 1787-1806 (1972), introduces the Semi-Implicit Method for Pressure Linked Equations (SIMPLE) method, which was the first successful steady-state algorithm for solving the incompressible Navier-Stokes equations and became the de facto industry standard in commercial CFD methods. The SIMPLE method was further developed by Vandoormal and Lilek, as described in Vandoormal et al., "Enhancements of the SIMPLE Method for Predicting Incompressible Fluid Flows," *Numer. Heat Transfer*, pages 147-163, (1984) and Lilek et al., "Efficiency and accuracy aspects of a full-multi-grid SIMPLE algorithm for three-dimensional flows," *Numerical Heat Transfer, Par B: Fundamentals*, pages 23-42 (1996).

While time-dependent methods exist, these existing methods are not without their drawbacks. Traditional time-dependent projection methods are only accurate when the time increment used to advance the solution is smaller than the advection and diffusion time scales. This limits the potential of implicit discretization algorithms which can handle larger time increments. Further, it is not uncommon for the time increment required by the transient projection algorithm to be the same order of magnitude as the time increments required by explicit algorithms (the time steps required is usually computed with a Courant-Friedrichs-Lowy (CFL) number on the order of 1.0).

Similarly, the SIMPLE method, while used extensively, has disadvantages. Firstly, the SIMPLE method is not optimal for the time-dependent Navier-Stokes equations. Because of this, CFD providers are sometimes forced to provide individualized algorithms to solve time-dependent and steady-state flows. This customization increases the amount of work required for software testing and maintenance and places the burden of algorithm selection on the user. Secondly, the stability and convergence of the SIMPLE method is controlled by under-relaxation factors that have values that are not universal and depend upon the flow being simulated, as described in Patankar, "Numerical Heat Transfer and Fluid Flow," McGraw-Hill, New York, N.Y. (1980). Thirdly, in general, the SIMPLE method requires more iterations to reach the steady-state solution as the number of elements in the mesh (which represents the object being simulated) increases, as noted in Morii, "A New Efficient Algorithm for Solving an Incompressible Flow on Relatively Fine Mesh," *Numerical Heat Transfer, Part B*, pages 593-610 (2005) and Segal et al., "Preconditioner for Incompressible Navier-Stokes Solvers," *Numer. Math. Theor. Meth. Appl.*, pages 245-275 (2010). Because the number of iterations increases as mesh complexity increases, the SIMPLE method does not scale properly with the size of the model. This issue is becoming more problematic because increased simulation complexity and model size is becoming more common due to the availability of more powerful computing devices.

Embodiments of the present invention overcome the foregoing deficiencies and provide methods and systems for simulating real-world systems, such as computational fluid dynamics systems. The method 100, depicted in FIG. 1, is one such example embodiment. The method 100 begins at step 101 by generating a time-dependent system of equations representing a real-world system, where the time dependent system of equations has a defined constraint. According to an embodiment, the time-dependent system of equations defined at step 101 is defined according to principles known in the art. For instance, in one such embodiment of the method 100, the generated time dependent system of equations are Navier-Stokes equations that represent a computational fluid dynamics system. Moreover, according to an embodiment, the system of equations is generated at step 101 from one or more models, e.g., a finite element mesh, that represents the real-world system or device being simulated. In an embodiment, the system of equations is generated in response to user interaction. For example, a user may define all of the properties of the system of equations using techniques known in the art. This may include defining equation properties in such a way that the system of equations conforms to all of the parameters of the real-world system being simulated. Further, the system of equations may represent any real-world system, device, or proposed real-world system or device, such as a car, bomb detonation, or space vehicle. Similarly, the system of equations generated at step 101 may have a constraint as is known in the art. According to an embodiment, the constraint is one or more principle of the system that limits operation of the real-world system. For instance, an example constraint may be that a roller coaster's path is constrained to the track.

As described herein, the system of equations generated at step 101 defines the properties, e.g. physical properties, such as mass, materials, and dimensions, of the real-world system being simulated. To illustrate an example implementation, at step 101, a system of equations is defined that represents the properties of a system in which a car is driving on a road, such as the dimensions, materials, mass, and speed of the car along with the material of the road and position of the road in space. Further, in such an example, the system of equations is generated to have a constraint, one such example being that the fluid (air around the car) is incompressible.

To continue the method 100, the constraint is de-coupled from the time dependent system of equations (generated at step 101) using a matrix representing an approximation of physics of the real-world system at step 102, such that a first system of equations representing the constraint is generated and a second system of equations representing physics of the real-world system is generated. In an embodiment, the matrix representing an approximation of physics of the real-world system used in the de-coupling at step 102 is a matrix that commutes with a matrix representing the constraint. In an embodiment, the constraint is de-coupled at step 101 as described herein below in relation to equation (6.b). According to an embodiment, the physics of the real-world system which is approximately given by the matrix used in the de-coupling, and which further, is represented by the second system of equations, may represent any physics properties of the system that are known in the art, e.g., motion.

To illustrate step 102 of the method 100, consider the aforementioned car example. In such an example, at step 102, the matrix used to de-couple the system of equations and the second system of equations generated, may represent motion of the car on the road. Similarly, in such an example, the first system of equations generated represents the constraint, i.e., the incompressible fluid surrounding the car. Further detail regarding de-coupling is described herein below.

Next, in the method 100, the generated first system of equations and the second system of equations are solved at step 103. According to an embodiment, these systems of equations may be solved using any methodology known in the art. For instance, these equations can be solved with direct or iterative matrix solvers, including but not limited to, Gauss elimination, Kyrlov subspace methods, and multigrid methods. However, while embodiments of the method 100 may solve the system of equations utilizing known methods, unlike existing methodologies, the system of equations may be solved at step 103 without determining an inverse of the matrix representing an approximation of physics of the real-world system. Such a benefit results from the de-coupling process performed at step 102. Further detail regarding such functionality is illustrated herein below in relation to equations (6.a) through (7.5). It is particularly advantageous to not determine the inverse of a matrix representing physics of the real-world system because such a determination, which is required by existing methods, is computationally very expensive.

To continue, the method 100, at step 104, automatically simulates the real-world system by generating a simulation of the real-world system using results from solving the generated first and second systems of equations. In an embodiment, the simulation is generated at step 104 using the results from solving the systems of equations according to principles known in the art. According to an embodiment, the simulation is a CFD simulation. In yet another embodiment, the CFD simulation is a steady state simulation or a transient simulation. To illustrate step 104, once again returning to the aforementioned car example, after solving the systems of equations at step 103, where one system of equations represents the physics of the car and the other system of equations represents incompressibility of the air surrounding the car, the method at step 104 may generate a simulation of the car driving down the road and visually illustrate the system of the car to a user via a display. Further, such a system may provide output indicating various parameters of the system, e.g., the speed at which the car travels, the drag force on the car, the aerodynamic noise generated, engine cooling efficiency, and exhaust plume.

An alternative embodiment of the method 100 further comprises improving design of the real-world system using results of the simulation. Such an embodiment may include facilitating design improvements. For instance, the simulation generated at step 104 may identify points in the real-world system that are possible sources of failure or points in the system that exceed safety requirements. These points may be illustrated to a user and/or indicated to the user through any means known in the art, so that the user can modify the design of the real-world system.

Further detail describing methodologies and systems for implementing embodiments of the present invention, such as the method 100, are described herein below. As described herein, embodiments of the present invention begin with generating a system of equations that represents a real-world system. One example embodiment utilizes the discretized Navier-Stokes equations given by equation 1.0 below. Further, the process illustrated below utilizes a backward Euler formulation, however, embodiments of the present invention are not so limited and may utilize higher order implicit time discretization methods, such as those described in Tannehill J. C., D. A. Anderson, R. H. Pletcher, Computational Fluid Mechanics and Heat Transfer [ISBN 1-56032-046-X], Philadelphia: Taylor & Francis (1997).

$$\begin{bmatrix} \frac{\rho V}{\Delta t} + A^n - K^n & G \\ D & 0 \end{bmatrix} \begin{Bmatrix} \delta u \\ \delta p \end{Bmatrix} = \begin{Bmatrix} -A^n + K^n - Gp^n \\ Du^n \end{Bmatrix} = \begin{Bmatrix} Rhs_{\delta u} \\ Rhs_{\delta p} \end{Bmatrix} \quad (1.0)$$

where $$A^n = \sum \rho^n u^n u^n \Box dA, \; K^n = \sum \mu^n \nabla u^n \Box dA, \; Gp^n = \nabla p^n dV \quad (1.a)$$
$$Du^n = \nabla \Box u^n, \; \delta u = u^{n+1} - u^n, \; \delta p = p^{n+1} - p^n$$
$$A^n = \frac{\partial A^n}{\partial u}, \; K = \frac{\partial K^n}{\partial u}, \; G = V\nabla$$

represent advection, diffusion, pressure gradient, velocity divergence, velocity correction and pressure correction, advection Jacobian, diffusion Jacobian, and gradient operator respectively.

In such an embodiment, a lower upper (LU) factorization is applied to the system of equations to derive the projection algorithm as described in Perot, "An Analysis of the Fractional Step Method," *Journal of Computation Physics*, pages 51-58, 1993, which yields the system of equations (2.0) below.

$$\begin{bmatrix} J & 0 \\ D & -DJ^{-1}G \end{bmatrix} \begin{bmatrix} I & J^{-1}G \\ 0 & I \end{bmatrix} \begin{Bmatrix} \delta u \\ \delta p \end{Bmatrix} = \begin{Bmatrix} Rhs_{\delta u} \\ Rhs_{\delta p} \end{Bmatrix} \quad (2.0)$$

$$J = \frac{\rho V}{\Delta t} + A^n - K^n \quad (2.a)$$

In the system of equations (2.0), I is the identity matrix, J is the approximate Jacobian matrix, and $J^{-1}$ is the inverse of the Jacobian matrix. The system of equations (2.0) can be further expressed in the following form $$\begin{bmatrix} J & 0 \\ D & -DJ^{-1}G \end{bmatrix} \begin{Bmatrix} \delta u^* \\ \delta p^* \end{Bmatrix} = \begin{Bmatrix} Rhs_{\delta u} \\ Rhs_{\delta p} \end{Bmatrix} \quad (3.a)$$

$$\begin{bmatrix} I & J^{-1}G \\ 0 & I \end{bmatrix} \begin{Bmatrix} \delta u \\ \delta p \end{Bmatrix} = \begin{Bmatrix} \delta u^* \\ \delta p^* \end{Bmatrix} \quad (3.b)$$

where $\delta u^*$ and $\delta p^*$ are the intermediate velocity correction and intermediate pressure correction, respectively, and are obtained by solving equation (3.a).

Once the intermediate pressure and velocity correction are obtained, the final solution to the system of equations (2.0) is obtained by solving equation 3.b, which yields $$\begin{Bmatrix} \delta u \\ \delta p \end{Bmatrix} = \begin{bmatrix} I & -J^{-1}G \\ 0 & I \end{bmatrix} \begin{Bmatrix} \delta u^* \\ \delta p^* \end{Bmatrix} \quad (3.c)$$

Thus, the variables are advanced as $$u^{n+1} = u^n - J^{-1}G\delta p^*$$

$$p^{n+1} = p^n + \delta p^* \quad (3.d)$$

Equations (3.a) through (3.d) can be written in the method form given by (4.0) below $$J\delta u^* = Rhs_{\delta u}$$

$$DJ^{-1}G\delta p^* = D(u^n + \delta u^*)$$

$$u^{n+1} = u^n - J^{-1}G\delta p^*$$

$$p^{n+1} = p^n + \delta p^* \quad (4.0)$$

The equations (4.0) are exact, however, in order to solve the equations (4.0) it is necessary to keep the inverse of the Jacobian matrix, $J^{-1}$, where J is given by the equation (2.a), even after the velocity corrections have been solved. This is problematic because computing and storing the inverse of the Jacobian matrix complicates the solution of the entire system of equations (4.0), in particular complicating the pressure correction Poisson equation. In practice, it is nearly impossible to compute and store the inverse of the Jacobian matrix because such a calculation is extremely time consuming and storing the solution utilizes extensive computer resources.

For time-dependent solutions with small time increments ($\Delta t$), the transient term dominates over the diffusive and advective terms. Therefore, when solving time-dependent solutions the inverse Jacobian can be approximated by $$J^{-1} \approx \frac{\Delta t}{\rho V} \quad (5.0)$$

In equation (5.0) ρ is density and V is volume. Substituting equation (5.0) into the equations (4.0) yields the standard pressure projection method for solving the system of equations representing the real-world system being simulated. The equations for the standard pressure projection method are described in Guermond, Minev, and Shen, "An Overview of Projection Methods For Incompressible Flows," *Comput. Methods Appl. Mech. Engrg*, pages 6011-6045, (2006), and shown below $$J\delta u^* = Rhs_{\delta u} \quad (5.1)$$

$$D\left(\frac{\Delta t}{\rho V}\right) G\delta p^* = D(u^n + \delta u^*)$$

$$u^{n+1} = u^n - \frac{\Delta t}{\rho V} G\delta p^*$$

$$p^{n+1} = p^n + \delta p^*$$

While the standard pressure projection method is useful, this method will only converge for small time increments Δt because the assumption underlying equation (5.0) only holds for small time increments. Consequently, the standard pressure projection method cannot be used for simulating steady state flows where Δt goes to infinity because such conditions invalidate equation (5.0).

When simulating steady-state systems, which requires solving steady-state solutions, the transient term is not present in equation (2.a) and the aforementioned SIMPLE method is used which assumes that the diagonal of the Jacobian matrix dominates over the off-diagonal elements, and therefore, the inverse of the Jacobian matrix can be approximated using the inverse of the Jacobian matrix's diagonal matrix $$J^{-1} = (\text{Diag } J)^{-1} \quad (6.0)$$

Substituting equation (6.0) into the equations (4.0) and introducing under-relaxation coefficients, which are described below, yields the equations (6.1), which are used in the SIMPLE method.

$$\frac{1}{\omega} IJ\delta u^* = Rhs_{\delta u} \quad (6.1)$$

$$D(\text{Diag} J)^{-1} G\delta p^* = D(u^n + \delta u^*)$$

$$u^{n+1} = u^n - (\text{Diag} J)^{-1} G\delta p^*$$

$$p^{n+1} = p^n + \theta \delta p^*$$

Unfortunately, the approximation of $J^{-1}$ that is used by the SIMPLE method, namely that $J^{-1}=(\text{Diag } J)^{-1}$ is incorrect and produces an unstable method. In order to fix the stability of the SIMPLE method, Patankar, "Numerical Heat Transfer and Fluid Flow," New York, N.Y. (1980), introduced under-relaxation coefficients θ and ω (I is the identity matrix) to stabilize the method and to compensate for the fact that SIMPLE uses the wrong approximation for $J^{-1}$. Unfortunately, the under-relaxation approach cannot fix the degradation in convergence that is exhibited when the mesh density increases because, as discussed in Morii, "A New Efficient Algorithm For Solving An Incompressible Flow On Relatively Fine Mesh," *Numerical Heat Transfer, Part B*, pgs. 593-610, (2005), the mesh dependency is implicitly built into (Diag J)$^{-1}$ and affects both the pressure Poisson equation, D(Diag J)$^{-1}$Gδp*=D(u''+δu*), and the final velocity update equation, $u^{n+1}=u^n-(\text{Diag } J)^{-1}G\delta p^*$, of (6.1).

As described hereinabove, generating transient simulations and steady state simulations using existing methods, which requires solving the equations (5.1) and (6.1), respectively, suffer from limitations that originate in the approximation of the inverse Jacobian matrix that are used to solve the equations. Embodiments of the present invention overcome these problems by providing methods and systems that utilize a better approximation of the Jacobian matrix or do not require solving the inverse Jacobian entirely.

Embodiments of the present invention provide improved simulation techniques. One such advantage results from implementing a method for solving the systems of equations representing the real-world systems, e.g., the Navier-Stokes equations, with improved convergence. In such an embodiment, this is provided by modifying the factorization of the block matrix of equation (1.0). To illustrate, consider an embodiment where it is assumed that the inverse Jacobian matrix and the gradient matrix can be approximated with some other matrix that resembles the inverse Jacobian matrix, $J^{-1}G=GM^{-1}$. According to an embodiment, the matrix M is a matrix representing an approximation of physics of the real-world system. When $J^{-1}G=GM^{-1}$ is substituted in equation (2.0), it yields equation (6.a)

$$\begin{bmatrix} J & 0 \\ D & -DGM^{-1} \end{bmatrix} \begin{bmatrix} I & GM^{-1} \\ 0 & I \end{bmatrix} \begin{Bmatrix} \delta u \\ \delta p \end{Bmatrix} = \begin{Bmatrix} Rhs_{\delta u} \\ Rhs_{\delta p} \end{Bmatrix} \quad (6.a)$$

Making this substitution allows the approximate inverse Jacobian matrix to be moved from the low block matrix and concentrate it on the upper block matrix as shown in equation (6.b).

$$\begin{bmatrix} J & 0 \\ D & -DG \end{bmatrix} \begin{bmatrix} I & GM^{-1} \\ 0 & M^{-1} \end{bmatrix} \begin{Bmatrix} \delta u \\ \delta p \end{Bmatrix} = \begin{Bmatrix} Rhs_{\delta u} \\ Rhs_{\delta p} \end{Bmatrix} \quad (6.b)$$

This is beneficial because the lower block matrix includes the linear systems that need to be solved, namely the pressure Poisson equation and the momentum equation, while the upper block matrix only includes the algebraic equations. Further, the approximate inverse Jacobian can be absorbed in the solution vector, so it can be removed from both block matrices as shown below $$\begin{bmatrix} J & 0 \\ D & -DG \end{bmatrix} \begin{Bmatrix} \delta u^* \\ \delta p^* \end{Bmatrix} = \begin{Bmatrix} Rhs_{\delta u} \\ Rhs_{\delta p} \end{Bmatrix} \quad (6.c)$$

$$\begin{bmatrix} I & G \\ 0 & I \end{bmatrix} \begin{Bmatrix} \delta u \\ M^{-1}\delta p \end{Bmatrix} = \begin{Bmatrix} \delta u^* \\ \delta p^* \end{Bmatrix}$$

After the velocity correction is solved, the inverse approximate Jacobian is no longer required in subsequent calculations $$\begin{Bmatrix} \delta u \\ \delta p \end{Bmatrix} = \begin{bmatrix} I & -G \\ 0 & I \end{bmatrix} \begin{Bmatrix} \delta u^* \\ M\delta p^* \end{Bmatrix} \quad (6.d)$$

In an embodiment, it can be assumed that the M matrix is the approximate Jacobian matrix, $M \approx J$, and all of the information required to solve the equations is available without ever computing the inverse of the approximate Jacobian matrix. Such equations (7.0) through (7.3) are shown below $$J\delta u^* = Rhs_{\delta u} \quad (7.0)$$

$$DG\delta p^* = D(u^n + \delta u^*) \quad (7.1)$$

$$u^{n+1} = u^n - G\delta p^* \quad (7.2)$$

$$p^{n+1} = p^n + M\delta p^* \quad (7.3)$$

By implementing a method for simulating a real-world system that solves the system of equations expressed by equations (7.0) through (7.3), embodiments of the present invention correct the degradation in convergence that the SIMPLE method experiences as the mesh resolution increases by removing the inverse Jacobian from the pressure Poisson equation (7.1) and the velocity update equation (7.2). The final pressure correction update, Equation (7.3) only requires an explicit evaluation of the operator M on the intermediate pressure correction ($\delta p^*$), this Jacobian operator includes all of the terms used in the momentum equation (7.0). By using M, which is assumed to be approximately equal to the complete Jacobian J, the convergence rate in solving systems of equations to simulate real-world systems by embodiments of the present invention is enhanced.

Embodiments of the present invention are also advantageous over existing methods because embodiments can be applied to both transient and steady state problems by changing the way the Jacobian matrix is defined. In such an embodiment, the transient formulation is given by $$J = \frac{\rho V}{\Delta t} + A^n - K^n \quad (7.4)$$

and the state-state formulation is given by $$J = A^n - K^n \quad (7.5)$$

Embodiments of the present invention provide methods and system for simulating constrained real-world systems, e.g. computational fluid dynamics simulations with incompressible flows, that can be applied to both transient and steady-state problems. In a computer implemented embodiment, this allows a single code to be used for both types of simulations. Advantageously, the convergence rate of embodiments of the present invention is independent of the mesh size of the real-world system being simulated because the pressure Poisson equation, e.g., equation (7.1), and the velocity update equation, e.g., equation (7.2), do not require the inverse of the Jacobian matrix and take less iterations to achieve a final steady-state solution than the SIMPLE method. Additionally, because the left hand side (LHS) of the pressure correction equation, equation (7.1), does not include the inverse Jacobian in embodiments, it is not required to recompute the LHS at every iteration, which further reduces the execution time of embodiments of the present invention. In contrast, the SIMPLE method performs the computationally expensive task of recomputing the LHS of equation (6.0) at every iteration. Moreover, embodiments of the present invention do not require the artificial under-relaxation coefficients to control the stability of the method.

Figure 2:
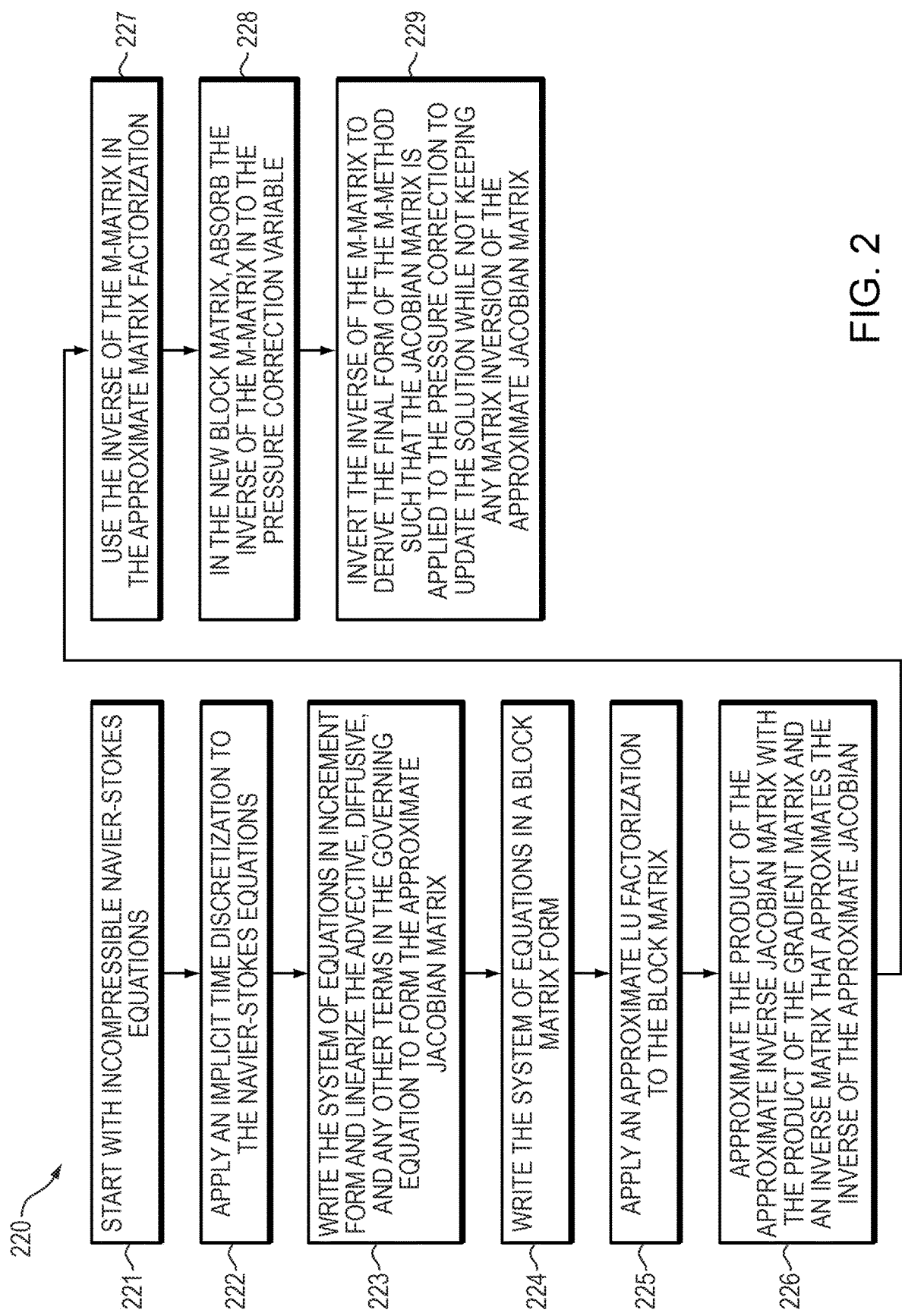
FIG. 2 is a flowchart depicting a method for simulating a real-world system that may be implemented in an embodiment.

FIG. 2 illustrates a method 220 of implementing a computational fluid dynamics simulation of a real-world system according to the principles of an embodiment of the present invention. Herein below, in relation to FIG. 2, equation numbers that refer to the aforementioned equations are interspersed to provide example functionality carried out at the various steps of the method 220. The method 220 begins at step 221 by defining the incompressible Navier-Stokes equations that represent the real-world system being simulated. At step 222, an implicit time discretization is applied to the Navier-Stokes equations defined at step 221 (equation 1.0). To continue, the Navier-Stokes equations defined at step 221 are written in increment form and the advective, diffusive, and any other terms in the governing equations are linearized to form the approximate Jacobian matrix at step 223. In turn, the system of equations is written in a block matrix form at step 224 and an approximate lower-upper factorization is applied to the block matrix at step 225 (equations 2.0 and 2.a). Next, the product of the approximate inverse Jacobian matrix, the gradient matrix, and an inverse matrix (the M matrix) is approximated at step 226 ($J^{-1}G = GM^{-1}$). The inverse of the M matrix is then used in the approximate matrix factorization (described by equation 6.a) at step 227, which yields a new block matrix (equations 6.b). According to an embodiment, the factorization uses two matrices to describe one matrix, as shown by the two matrices of equation 6.a. Thereafter, in the new block matrix, the inverse of the M matrix is absorbed into the pressure correction variable at step 228 (equation 6.c). Finally, the inverse of the M matrix is inverted to derive the final form of the M method such that the Jacobian matrix is applied to the pressure correction to update the solution while not keeping any matrix inversion of the approximate Jacobian matrix at step 229. This final step 229 may yield the equations (7.0-7.3) that can in turn be used to simulate the real-world system that is represented by the Navier-Stokes equations defined at step 221.

Figure 3:
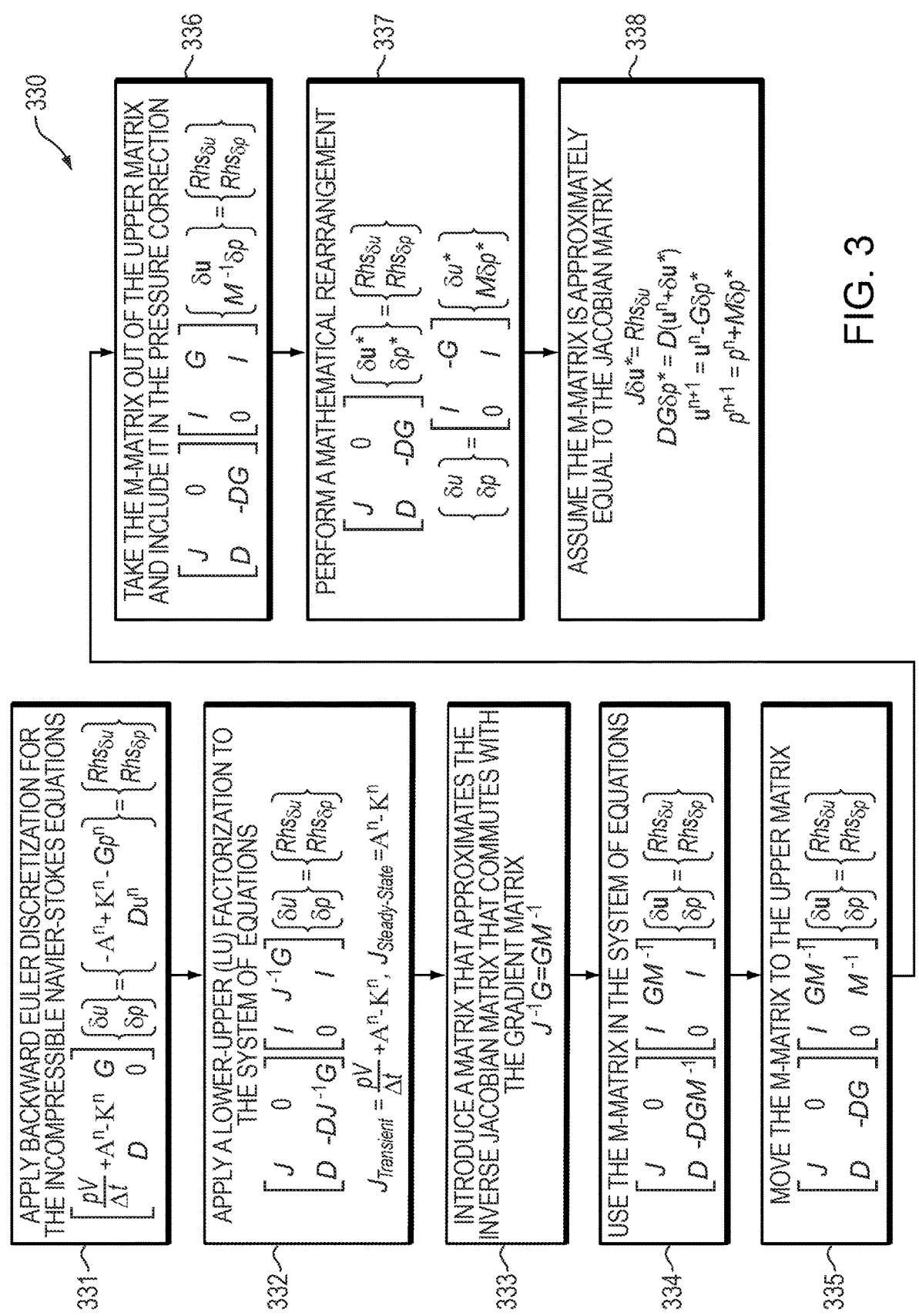
FIG. 3 illustrates yet another embodiment for simulating a real-world system according to the principles of the present invention.

FIG. 3 illustrates a method 330 for simulating a real-world system according to an embodiment of the present invention. The method 330 and part(s) thereof can be utilized to implement the various methods and systems described herein, e.g., the methods 100 and 220. The method 330 begins at step 331 by applying a backward Euler discretization for the incompressible Navier-Stokes Equations.

$$\begin{bmatrix} \frac{\rho V}{\Delta t} + A^n - K^n & G \\ D & 0 \end{bmatrix} \begin{Bmatrix} \delta u \\ \delta p \end{Bmatrix} = \begin{Bmatrix} -A^n - K^n - Gp^n \\ Du^n \end{Bmatrix} = \begin{Bmatrix} Rhs_{\delta u} \\ Rhs_{\delta p} \end{Bmatrix}$$

Next, a lower-upper factorization is applied to the system of equations at step 332.

$$\begin{bmatrix} J & 0 \\ D & -DJ^{-1}G \end{bmatrix} \begin{bmatrix} I & J^{-1}G \\ 0 & I \end{bmatrix} \begin{Bmatrix} \delta u \\ \delta p \end{Bmatrix} = \begin{Bmatrix} Rhs_{\delta u} \\ Rhs_{\delta p} \end{Bmatrix}$$

$$J_{Transient} = \frac{\rho V}{\Delta t} + A^n - K^n, \; J_{Steady\text{-}State} = A^n - K^n$$

In turn, at step 333, a matrix is introduced, the M matrix, that approximates the inverse Jacobian matrix that commutes with the gradient matrix.

$$J^{-1}G = GM^{-1}$$

Next, the M-matrix is substituted in the system of equations at step 334

$$\begin{bmatrix} J & 0 \\ D & -DGM^{-1} \end{bmatrix} \begin{bmatrix} I & GM^{-1} \\ 0 & I \end{bmatrix} \begin{Bmatrix} \delta u \\ \delta p \end{Bmatrix} = \begin{Bmatrix} Rhs_{\delta u} \\ Rhs_{\delta p} \end{Bmatrix}$$

and the M matrix is moved to the upper matrix at step 335.

$$\begin{bmatrix} J & 0 \\ D & -DGM^{-1} \end{bmatrix} \begin{bmatrix} I & GM^{-1} \\ 0 & I \end{bmatrix} \begin{Bmatrix} \delta u \\ \delta p \end{Bmatrix} = \begin{Bmatrix} Rhs_{\delta u} \\ Rhs_{\delta p} \end{Bmatrix}$$

To continue, at step 336, the M matrix is taken out of the upper matrix and included in the pressure correction.

$$\begin{bmatrix} J & 0 \\ D & -DG \end{bmatrix} \begin{bmatrix} I & G \\ 0 & I \end{bmatrix} \begin{Bmatrix} \delta u \\ M^{-1}\delta p \end{Bmatrix} = \begin{Bmatrix} Rhs_{\delta u} \\ Rhs_{\delta p} \end{Bmatrix}$$

The method 330 next performs a mathematical rearrangement at step 337 which yields the below equations.

$$\begin{bmatrix} J & 0 \\ D & -DG \end{bmatrix} \begin{Bmatrix} \delta u^* \\ \delta p^* \end{Bmatrix} = \begin{Bmatrix} Rhs_{\delta u} \\ Rhs_{\delta p} \end{Bmatrix}$$

$$\begin{Bmatrix} \delta u \\ \delta p \end{Bmatrix} = \begin{bmatrix} I & -G \\ 0 & I \end{bmatrix} \begin{Bmatrix} \delta u^* \\ M\delta p^* \end{Bmatrix}$$

Then, it is assumed that the M matrix is an approximation of the Jacobian matrix and the final equation formulations are determined at step 338.

$$J\delta u^* = Rhs_{\delta u}$$

$$DG\delta p^* = D(u^n + \delta u^*)$$

$$u^{n+1} = u^n - G\delta p^*$$

$$p^{n+1} = p^n + M\delta p^*$$

The equations determined at step 338 can, in turn, be used to generate a simulation of a real-world system.

Figure 4:
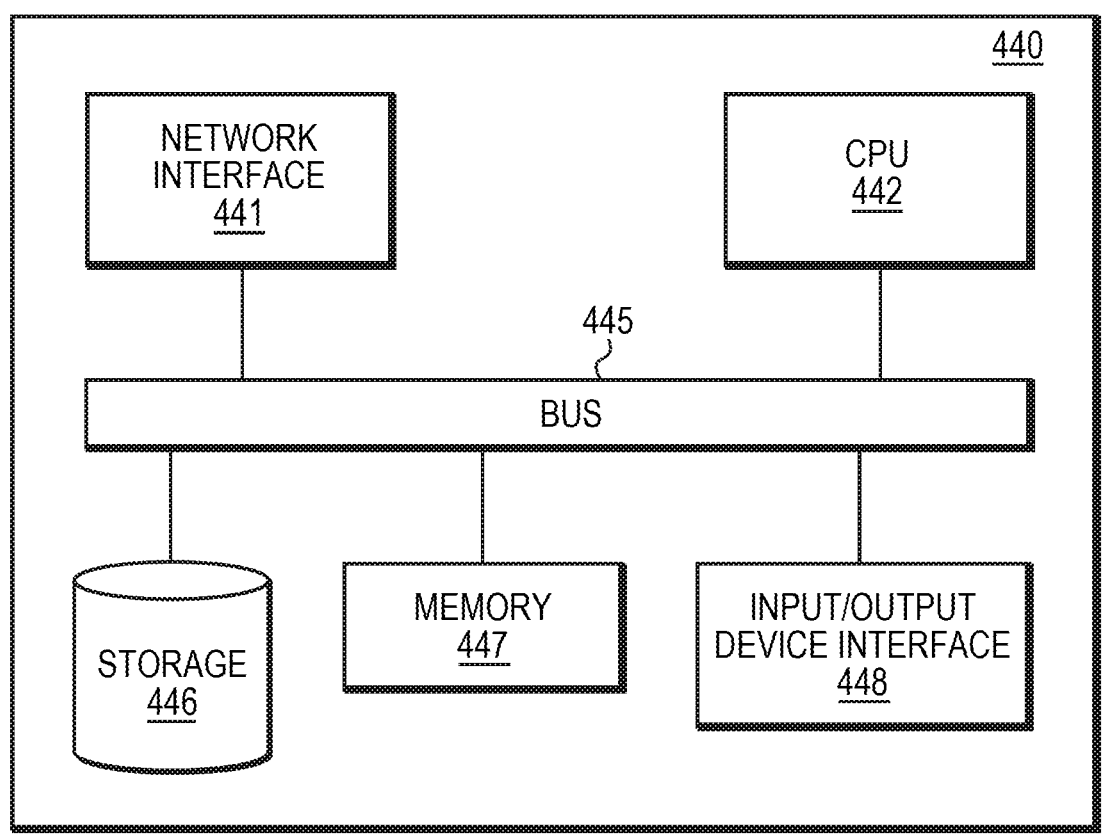
FIG. 4 is a simplified block diagram of a computer system for simulating a real-world system according to an embodiment.

FIG. 4 is a simplified block diagram of a computer-based system 440 that may be used to implement the various embodiments of the present invention described herein, e.g. the methods 100, 220, 330, etc. The computer based system 440 comprises a bus 445. The bus 445 serves as an interconnect between the various components of the system 440. Connected to the bus 445 is an input/output device interface 448 for connecting various input and output devices such as a keyboard, mouse, display, speakers, sensors, etc. to the computer based system 440. A central processing unit (CPU) 442 is connected to the bus 445 and provides for the execution of computer instructions. Memory 447 provides volatile storage for data used for carrying out computer instructions. Storage 446 provides non-volatile storage for software instructions, such as an operating system (not shown). The system 440 also comprises a network interface 441 for connecting to any variety of networks known in the art, including wide area networks (WANs) and local area networks (LANs).

It should be understood that the example embodiments described herein may be implemented in many different ways. In some instances, the various methods and machines described herein may each be implemented by a physical, virtual, or hybrid general purpose computer, such as the computer system 440, or a computer network environment such as the computer environment 550, described herein below in relation to FIG. 5. The computer system 440 may be transformed into the machines that execute the methods (e.g. 100, 220, 330) described herein, for example, by loading software instructions (program instructions that implement methods 100, 220, 330) into either memory 447 or non-volatile storage 446 for execution by the CPU 442. One of ordinary skill in the art should further understand that the system 440 and its various components may be configured to carry out any embodiments of the present invention described herein. Further, the system 440 may implement the various embodiments described herein utilizing any combination of hardware, software, and firmware modules operatively coupled, internally, or externally, to the system 440.

Figure 5:
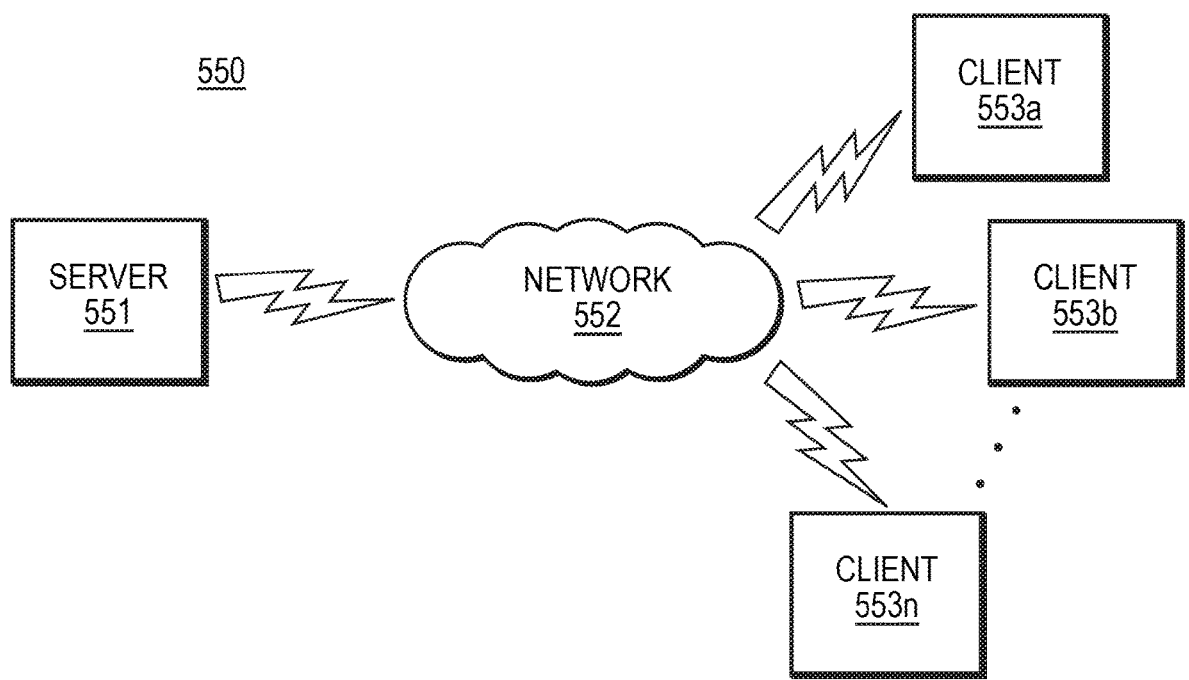
FIG. 5 is a simplified schematic diagram of a computer network environment in which an embodiment of the present invention may be implemented.

FIG. 5 illustrates a computer network environment 550 in which an embodiment of the present invention may be implemented. In the computer network environment 550, the server 551 is linked through the communications network 552 to the clients 553a-n. One or more clients 553 are configured as computer based system 440 described above. The environment 550 may be used to allow the clients 553a-n, alone or in combination with the server 551, to execute any of the methods (e.g. 100, 220, 330) described hereinabove.

Embodiments or aspects thereof may be implemented in the form of hardware, firmware, or software. If implemented in software, the software may be stored on any non-transitory computer readable medium that is configured to enable a processor to load the software or subsets of instructions thereof. The processor then executes the instructions and is configured to operate or cause an apparatus to operate in a manner as described herein.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and thus, the data processors and digital processors described herein are intended for purposes of illustration only and not as a limitation of the embodiments. Further, output of the above described computer client/server/networks embodying principles of the present invention can be fed (e.g., streamed, by batch, etc.) to other engineering systems, manufacturing systems, controller systems (especially model-based), and the like, for implementing further automation and/or display of results.

While this invention has been particularly shown and described with references to example embodiments thereof, it will be understood by those skilled in the art that various changes in form and details may be made therein without departing from the scope of the invention encompassed by the appended claims.

What is claimed is:

1. A computer implemented method of simulating a real-world system, the method comprising:
using one or more processors:
receiving a defined constraint, by an input/output device interface, communicatively coupled to the one or more processors;
generating a time dependent system of equations representing a real-world system, the time dependent system of equations having the defined constraint, wherein the constraint is an incompressibility of a fluid in the real-world system;
de-coupling the incompressibility constraint from the generated time dependent system of equations using a matrix representing an approximation of physics of the real-world system, the de-coupling generating a first system of equations representing the incompressibility constraint and a second system of equations representing physics of the real-world system;
automatically solving the generated first system of equations representing the incompressibility constraint and the generated second system of equations representing physics of the real-world system without determining an inverse of the matrix representing an approximation of physics of the real-world system;
automatically simulating, by the one or more processors, the real-world system by generating a simulation of the real-world system using results from solving the generated first and second systems of equations; and
modifying a design of the real-world system using results of the simulation.

2. The method of claim 1 wherein the simulation is a computational fluid dynamics (CFD) simulation.

3. The method of claim 2 wherein the CFD simulation is a steady state simulation or a transient simulation.

4. The method of claim 1 wherein the generated time dependent system of equations are Navier-Stokes equations.

5. The method of claim 1 wherein the matrix representing an approximation of physics of the real-world system commutes with a matrix representing the constraint.

6. The method of claim 1 wherein the physics of the real-world system is motion.

7. A computer system for simulating a real-world system, the computer system comprising:
a processor; and
a memory with computer code instructions stored thereon, the processor and the memory, with the computer code instructions thereon, being configured to cause the system to:
receive a defined constraint, by an input/output device interface, communicatively coupled to the processor;
generate a time dependent system of equations representing a real-world system, the generated time dependent system of equations having the defined constraint wherein the constraint is an incompressibility of a fluid in the real-world system;
de-couple the incompressibility constraint from the time dependent system of equations using a matrix representing an approximation of physics of the real-world system, the de-coupling generating a first system of equations representing the constraint and a second system of equations representing physics of the real-world system;
automatically solve the generated first system of equations that represents the incompressibility constraint and the generated second system of equations that represents the physics of the real-world system;
automatically simulate the real-world system by generating a simulation of the real-world system using results from solving the generated first and second systems of equations; and
modify a design of the real-world system using results of the simulation.

8. The system of claim 7 wherein solving the generated first system of equations and the generated second system of equations is performed without determining an inverse of the matrix representing an approximation of physics of the real-world system.

9. The system of claim 7 wherein the simulation is a computational fluid dynamics (CFD) simulation.

10. The system of claim 9 wherein the CFD simulation is a steady state simulation or a transient simulation.

11. The system of claim 7 wherein the generated time dependent system of equations are Navier-Stokes equations.

12. The system of claim 7 wherein the matrix representing an approximation of physics of the real-world system commutes with a matrix representing the constraint.

13. The system of claim 7 wherein the physics of the real-world system is motion.

14. A computer program product for simulating a real-world system, the computer program product executed by a server in communication across a network with one or more clients and comprising:
a non-transitory computer readable medium, the computer readable medium comprising program instructions which, when executed by a processor causes the processor to:
receive a defined constraint, by an input/output device interface, communicatively coupled to the server;
generate a time dependent system of equations representing a real-world system, the time dependent system of equations having a defined constraint wherein the constraint is an incompressibility of a fluid in the real-world system;
de-couple the incompressibility constraint from the time dependent system of equations using a matrix representing an approximation of physics of the real-world system, the de-coupling generating a first system of equations representing the constraint and a second system of equations representing physics of the real-world system;
automatically solve the generated first system of equations and the generated second system of equations;
automatically simulate the real-world system by generating a simulation of the real-world system using results from solving the generated first and second systems of equations; and
modify a design of the real-world system using results of the simulation.

15. The computer program product of claim 14 wherein solving the generated first system of equations and the generated second system of equations is performed without determining an inverse of the matrix representing an approximation of physics of the real-world system.

* * * * *